(12) United States Patent
Wang et al.

(10) Patent No.: US 8,364,376 B2
(45) Date of Patent: Jan. 29, 2013

(54) TORQUE MODEL-BASED COLD START DIAGNOSTIC SYSTEMS AND METHODS

(75) Inventors: Lan Wang, Troy, MI (US); Robert J. Genslak, Macomb, MI (US); Wenbo Wang, Novi, MI (US); Matthew Squire, Fenton, MI (US); Jinchun Peng, Canton, MI (US); Edward Stuteville, Linden, MI (US); Kurt D. McLain, Clarkston, MI (US)

(73) Assignee: GM Global Technology Operations LLC

( * ) Notice: Subject to any disclaimer, the term of this patent is extended or adjusted under 35 U.S.C. 154(b) by 1008 days.

(21) Appl. No.: 12/394,716

(22) Filed: Feb. 27, 2009

(65) Prior Publication Data

US 2010/0222982 A1 Sep. 2, 2010

(51) Int. Cl.
*G06F 19/00* (2011.01)
*G06G 7/70* (2006.01)
*F01N 3/00* (2006.01)

(52) U.S. Cl. .......................................... 701/102; 60/285

(58) Field of Classification Search .................... 60/285, 60/299, 286; 73/23.31; 701/102, 113
See application file for complete search history.

(56) References Cited

U.S. PATENT DOCUMENTS

| | | | |
|---|---|---|---|
| 4,393,696 A | 7/1983 | Willis et al. | |
| 5,253,623 A | 10/1993 | Melnyk et al. | |
| 5,303,168 A * | 4/1994 | Cullen et al. | 700/299 |
| 6,704,638 B2 | 3/2004 | Livshiz | |
| 6,871,136 B1 | 3/2005 | Wang et al. | |
| 7,424,801 B2 * | 9/2008 | Mukaihira et al. | 60/277 |
| 7,463,970 B2 | 12/2008 | Livshiz et al. | |
| 7,606,652 B2 | 10/2009 | Kaiser et al. | |
| 7,630,826 B2 | 12/2009 | Wang et al. | |
| 7,748,362 B2 | 7/2010 | Whitney et al. | |
| 7,793,489 B2 | 9/2010 | Wang et al. | |
| 7,980,221 B2 | 7/2011 | Baur et al. | |
| 2003/0041845 A1* | 3/2003 | Akao et al. | 123/568.16 |
| 2005/0279156 A1* | 12/2005 | He et al. | 73/23.31 |
| 2006/0288693 A1* | 12/2006 | Endo | 60/297 |
| 2007/0156325 A1 | 7/2007 | Livshiz et al. | |
| 2008/0195297 A1 | 8/2008 | Wang | |
| 2009/0126346 A1* | 5/2009 | Daneau | 60/285 |
| 2009/0241899 A1 | 10/2009 | Whitney et al. | |
| 2010/0222982 A1* | 9/2010 | Wang et al. | 701/102 |
| 2010/0242445 A1* | 9/2010 | Iwahashi et al. | 60/286 |

FOREIGN PATENT DOCUMENTS

CN 101245742 8/2008

* cited by examiner

*Primary Examiner* — Stephen K Cronin
*Assistant Examiner* — Sizo Vilakazi

(57) ABSTRACT

A control system for an engine having a catalytic converter includes an energy calculation module that calculates a calculated mass air flow (MAF) of intake air of the engine based on a requested torque and a requested spark timing that correspond to a desired thermal energy of exhaust of the engine, and that determines an expected thermal energy of the exhaust based on the calculated MAF, and an energy residual module that determines a thermal energy residual of the exhaust based on the expected thermal energy and an estimated thermal energy of the exhaust, wherein the estimated thermal energy is based on a measured MAF of the intake air. The control system includes an energy evaluation module that determines a diagnostic result that indicates whether the catalytic converter is operating within a target temperature range based on the thermal energy residual. Related control methods are also provided.

14 Claims, 5 Drawing Sheets

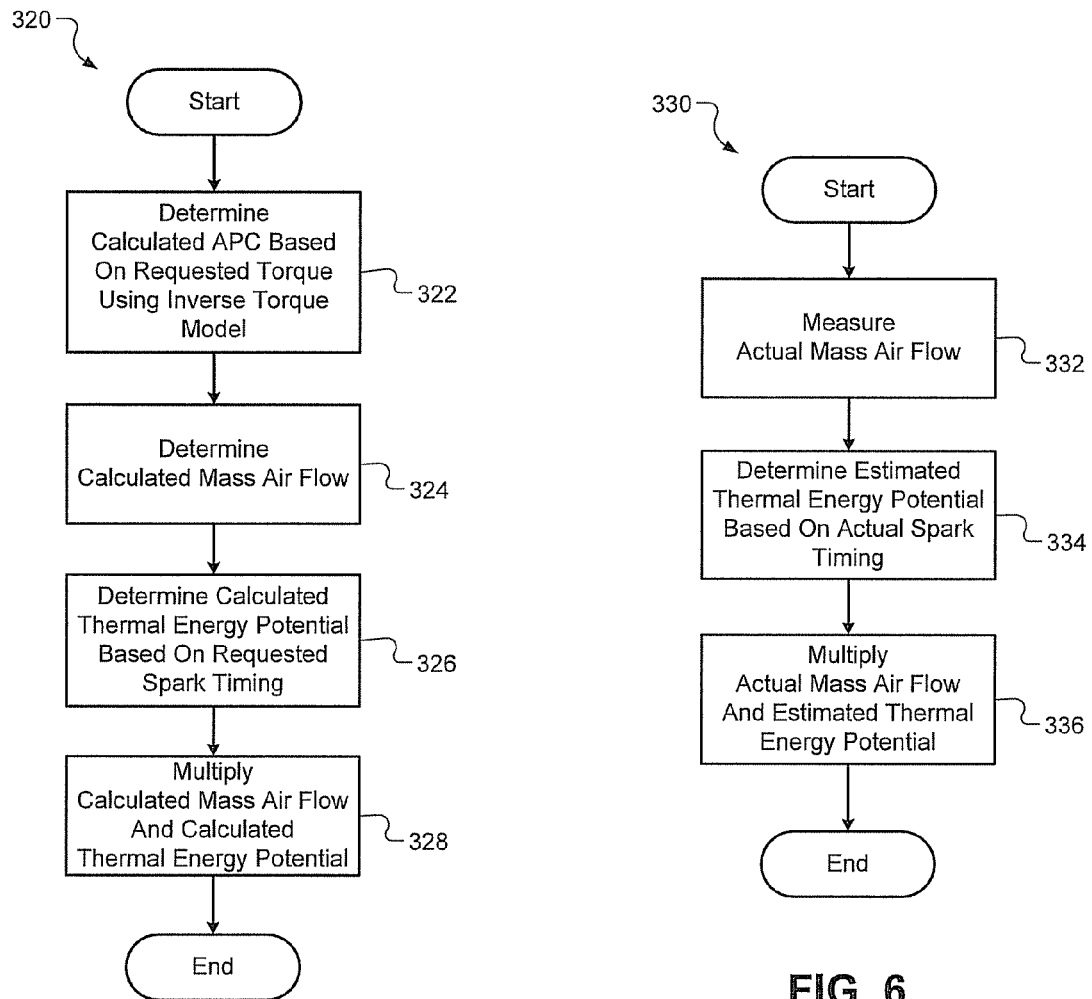

TORQUE MODEL-BASED COLD START DIAGNOSTIC SYSTEMS AND METHODS

FIELD

The present disclosure relates to diagnostic systems for internal combustion engines, and more particularly, to control systems and methods for determining an exhaust gas energy residual value.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Motorized vehicles may include a powertrain including a powerplant, a multispeed transmission, and a differential or final drive train. The powerplant produces drive torque that is transmitted through one of various gear ratios of the transmission to the final drive train to drive wheels of the vehicle. Hybrid powerplants may include a combination of an internal combustion engine and one or more electric motors that supply drive torque to the transmission.

Catalytic converters may be used to reduce the concentration of emissions contained in the exhaust gases produced during combustion by the engine that is exhausted by the vehicle. In order to function properly and reduce the concentration of emissions, catalytic converters should be operated at sufficient operating temperatures. The operating temperature of the catalytic converter is largely influenced by the thermal energy of the exhaust entering the catalytic converter. The operating temperature of the catalytic converter is also dependent on the amount of time the engine has been operating.

After prolonged periods of engine inactivity, the temperature of the catalytic converter may be low. During subsequent cold starting, operation of the engine may be regulated during a catalyst light-off process to produce sufficient thermal energy in the exhaust to heat the converter to within a target temperature operating range.

Cold start emission (CSED) diagnostics may monitor a difference between an actual and a desired thermal energy of the exhaust. The CSED diagnostics may monitor the difference, typically referred to as a thermal energy residual, to assess whether the catalytic converter is operating within the target temperature operating range within a desired amount of time. The CSED diagnostics may periodically compare the thermal energy residual with a predetermined energy range to assess whether the exhaust is heating the catalytic converter as desired. Additionally, the CSED diagnostics may monitor the thermal energy residual to assess whether the concentration of emissions meets applicable state and federal standards.

SUMMARY

The present disclosure provides an exemplary control system and method that improves the determination of the thermal energy residual used to assess whether the catalytic converter is operating within the target temperature operating range. In one form, the present disclosure provides a control system for an engine including a catalytic converter that includes an energy calculation module that calculates a calculated mass air flow (MAF) of intake air of the engine based on a requested torque and a requested spark timing that correspond to a desired thermal energy of the exhaust, and that determines an expected thermal energy of exhaust of the engine based on the calculated MAF, and an energy residual module that determines a thermal energy residual of the exhaust based on the expected thermal energy and an estimated thermal energy of the exhaust, wherein the estimated thermal energy is based on a measured MAF of the intake air.

In a related feature, the energy calculation module calculates the calculated MAF based on a square of the requested spark timing.

In another feature, the control system includes an energy evaluation module that determines a diagnostic result based on a comparison of the thermal energy residual and a predetermined energy range, wherein the diagnostic result indicates whether the catalytic converter is operating within a target temperature range. The predetermined energy range includes a first threshold energy lower than a second threshold energy, wherein the first threshold energy is indicative of underheating the catalytic converter and the second threshold energy is indicative of overheating the catalytic converter.

In yet another feature, the energy residual module periodically determines a plurality of thermal energy residuals during a diagnostic period, the energy evaluation module determines the diagnostic result after the energy evaluation module has determined a predetermined number (R) of the thermal energy residuals, R being an integer greater than one, and the energy evaluation module determines the diagnostic result based on a comparison of an average of the R thermal energy residuals and the predetermined energy range.

In an alternate feature, the energy residual module determines a plurality of thermal energy residuals during a predetermined diagnostic period, and the energy evaluation module determines the diagnostic result after the predetermined diagnostic period based on a comparison of an average of the plurality of thermal energy residuals and the predetermined energy range.

In another form, the present disclosure provides a method for determining a thermal energy residual of exhaust of an engine that includes measuring an actual mass air flow (MAF) of intake air of the engine, calculating a calculated MAF of the intake air based on a requested torque and a requested spark timing that correspond to a desired thermal energy of the exhaust, and determining the thermal energy residual based on an expected thermal energy of the exhaust and an estimated thermal energy of the exhaust, wherein the expected thermal energy is based on the calculated MAF and the estimated thermal energy is based on the actual MAF. In related features, the calculating the calculated MAF includes calculating the calculated MAF based on a square of the requested spark timing.

In yet another form, the present disclosure provides a diagnostic method for an engine having a catalytic converter that includes measuring an actual mass air flow (MAF) of intake air of the engine, calculating a calculated MAF of the intake air of the engine based on a requested torque and a requested spark timing that correspond to a desired thermal energy of exhaust of the engine, determining a thermal energy residual of the exhaust based on an expected thermal energy of the exhaust and an estimated thermal energy of the exhaust, wherein the expected thermal energy is based on the calculated MAF and the estimated thermal energy is based on the actual MAF, and determining a diagnostic result by comparing the thermal energy residual and a predetermined energy range. In the diagnostic method, the diagnostic result indicates whether the catalytic converter is operating within a target temperature range. The predetermined energy range includes a first threshold energy lower than a second threshold energy, wherein the first threshold energy is indicative of underheating the catalytic converter and the second threshold energy is indicative of overheating the catalytic converter.

In one feature, the diagnostic method further includes determining a predetermined number (R) of the thermal energy residuals during a diagnostic period, R being an integer greater than one, wherein the determining the diagnostic result is performed after determining the R thermal energy residuals by comparing an average of the R thermal energy residuals and the predetermined energy range.

In an alternate feature, the diagnostic method further includes determining a plurality of thermal energy residuals during a predetermined diagnostic period, wherein the determining the diagnostic result is performed after the diagnostic period by comparing an average of the plurality of thermal energy residuals and the predetermined energy range.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5 is a partial flow diagram illustrating additional exemplary steps for the control method shown in FIG. 4; and FIG. 6 is a partial flow diagram illustrating additional exemplary steps for the control method shown in FIG. 4.

DETAILED DESCRIPTION

Figure 1:
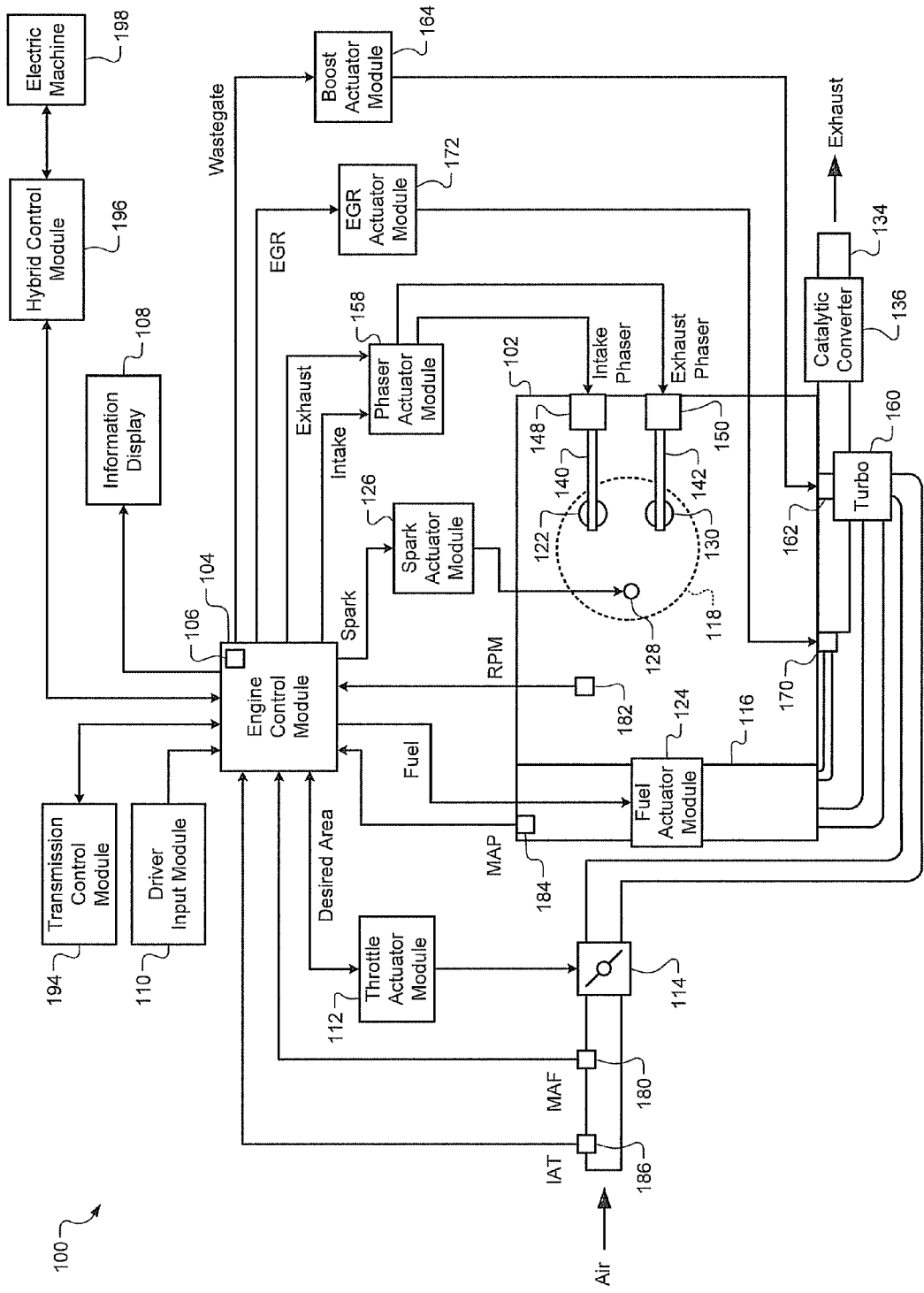
FIG. 1 is a functional block diagram illustrating an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable hardware components that provide the described functionality.

The concentration of emissions in the exhaust depends on the operating temperature of the catalytic converter. Accordingly, the CSED diagnostics may calculate and monitor a thermal energy residual of the exhaust to assess whether the target operating conditions are being met and estimated emissions do not exceed the applicable standards. For example, the CSED diagnostics may compare the thermal energy residual with a threshold energy value when performing a diagnostic assessment. The threshold energy value may be a predetermined value corresponding to the thermal energy residual for a system operating just outside the target operating conditions (i.e. best performance unacceptable (BPU) system).

Achieving good correlation between the calculated thermal energy residual and the estimated emissions is important to obtaining the proper diagnostic assessment. In particular, achieving good correlation at low throttle rates of, for example, eight to ten percent or less, is important, since CSED diagnostic assessments are often performed when the engine is idling.

Achieving good separation between the thermal energy residual calculated for a system operating within the target operating conditions and the threshold energy value corresponding to the BPU system is also important. Separation helps avoid failing the diagnostic assessment when the catalytic converter is operating as desired. Separation also helps avoid passing the diagnostic assessment when the catalytic converter is not operating as desired.

Accordingly, the present disclosure provides an exemplary control system and method that improves the determination of the thermal energy residual in a torque-based engine control system. The control system and method of the present disclosure calculates a thermal energy residual based on a calculated mass air flow of the engine corresponding to the desired thermal energy of the exhaust, and a measured engine air flow. More specifically, the control system and method calculate the calculated mass air flow based on a requested engine torque according to an inverse torque model. The control system and method may also calculate the calculated mass air flow based on a requested spark timing.

During periods when a catalyst light-off and/or cold start emissions control process is active, the requested engine torque generally corresponds to an engine torque at which the desired thermal energy of the exhaust may be produced. Similarly, the requested spark timing will generally correspond to a spark timing at which the desired thermal energy of the exhaust may be produced at the requested engine torque. The calculated mass air flow is used to determine an expected thermal energy of the exhaust.

The control system and method of the present disclosure determines an estimated actual thermal energy of the exhaust based on the measured engine air flow. The thermal energy residual is calculated based on the expected thermal energy and the estimated actual thermal energy.

By determining the expected thermal energy and the estimated actual thermal energy in the foregoing manner, the control system and method of the present disclosure improve the correlation between the calculated thermal energy residual and the estimated emissions. By improving the correlation, the control system and method of the present disclosure also increase the separation between the thermal energy residual calculated for the system operating as desired and the threshold energy value corresponding to the BPU system.

With particular reference to FIG. 1, a functional block diagram of an exemplary engine system 100 according to the principles of the present disclosure is shown. The engine system 100 may be included with a hybrid vehicle, such as a series-type hybrid vehicle or a parallel-type hybrid vehicle. The engine system 100 includes an engine 102 that is regulated by an engine control module (ECM) 104. The engine system 100 also includes a catalyst diagnostic module 106 that monitors operation of the engine system 100 according to the principles of the present disclosure. The catalyst diagnostic module 106 may communicate with an information display 108 that displays a status of the operation of the engine system 100.

The engine 102 combusts an air/fuel mixture to produce drive torque in response to control signals generated by the ECM 104 in response to driver signals received from a driver input module 110. Air is drawn into an intake manifold 116 through a throttle valve 114. The ECM 104 commands a throttle actuator module 112 to regulate opening of the throttle valve 114 to control the amount of air drawn into the intake manifold 116.

Air from the intake manifold 116 is drawn into cylinders of the engine 102. While the engine 102 may include multiple cylinders (i.e. two or more), for illustration purposes, a single representative cylinder 118 is shown. Air from the intake manifold 116 is drawn into the cylinder 118 through an intake valve 122. The ECM 104 controls a fuel actuator module 124, which regulates the amount of fuel injected by a fuel injection system (not shown) to achieve a desired air/fuel ratio. In various implementations, fuel may be injected into the intake manifold 116 at a central location or at multiple locations, such as near the intake valve 122 of each cylinder 118. Alternatively, fuel may be injected directly into the cylinder 118. The ECM 104 may instruct the fuel actuator module 124 to halt provision of fuel to deactivate some of the cylinders (e.g., cylinder 118). The ECM 104 may deactivate cylinders under certain engine operating conditions and thereby improve fuel economy.

The injected fuel mixes with the air that has entered the engine 102 and creates the air/fuel mixture in the cylinder 118. A piston (not shown) within the cylinder 118 compresses the air/fuel mixture. A spark actuator module 126 energizes a spark plug 128 located in the cylinder 118 that ignites the air/fuel mixture. The ECM 104 controls the spark actuator module 126 and thereby controls the timing of the spark (i.e. spark timing) generated by the spark plug 128. The timing of the spark may be specified relative to the time when the piston is at its topmost position, referred to as to top dead center (TDC), and the point at which the air/fuel mixture is most compressed. Operation of the spark actuator module 126 may therefore be synchronized with crankshaft rotation. In various implementations, the spark actuator module 126 may halt provision of spark to deactivate some of the cylinders (e.g., cylinder 118). The ECM 104 may instruct the spark actuator module 126 to halt provision of spark when deactivating the cylinders.

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134. The exhaust system 134 may include a catalytic converter 136 that reduces the concentration of harmful emissions contained in the exhaust.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals received from the ECM 104. When implemented, variable valve lift may also be controlled by the phaser actuator module 158.

The engine system 100 may include a boost device that provides pressurized air to the intake manifold 116. For example, the engine system 100 may include a turbocharger 160 as shown. The turbocharger 160 is powered by exhaust gases flowing through the exhaust system 134, and pressurizes air entering the engine 102. The turbocharger 160 may provide a compressed air charge to the intake manifold 116. In various implementations, a supercharger (not shown), driven by the crankshaft, may compress air from the throttle valve 114 and deliver the compressed air to the intake manifold 116.

Figure 2:
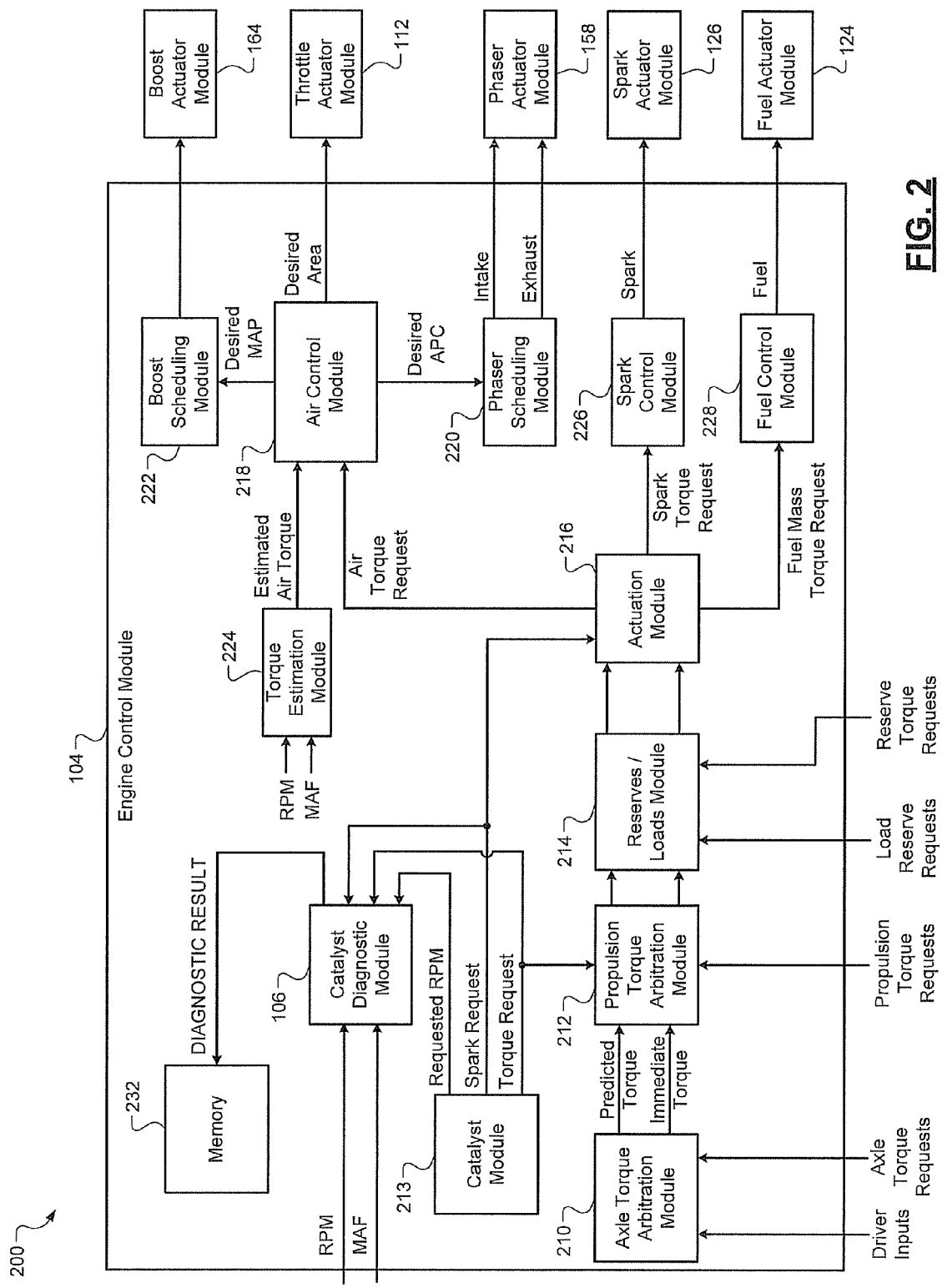
FIG. 2 is a functional block diagram illustrating an exemplary engine control system according to the principles of the present disclosure.

A wastegate 162 may allow exhaust gas to bypass the turbocharger 160, thereby reducing the turbocharger's output (i.e. the amount of compression of the compressed air charge). A boost actuator module 164 may modulate the boost of the turbocharger 160 by controlling the position of the wastegate 162. The ECM 104 controls the turbocharger 160 via the boost actuator module 164 (FIG. 2). The compressed air charge is provided to the intake manifold 116 by the turbocharger 160.

The engine system 100 may include an exhaust gas recirculation (EGR) valve 170, which selectively redirects exhaust back to the intake manifold 116. The EGR valve 170 may be located upstream of the turbocharger 160. The ECM 104 may control the EGR valve 170 via an EGR actuator module 172 and thereby regulate the amount of exhaust redirected.

The engine system 100 may further include various sensors that measure operating conditions of the engine 102. The sensors output signals that may be used by the ECM 104 to determine the operating conditions of the engine 102. For example only, the engine system 100 may include a mass air flow (MAF) sensor 180, an engine output speed (EOS) sensor 182, a manifold absolute pressure (MAP) sensor 184, and an intake air temperature (IAT) sensor 186. The engine system 100 may include other sensors not shown in FIG. 1, such as, but not limited to, a throttle position sensor, a coolant temperature sensor, an oil temperature sensor, and an oxygen sensor.

The MAF sensor 180 measures the mass of air flowing (i.e. mass flow rate) into the intake manifold 116. While the MAF sensor 180 is shown upstream of the throttle valve 114, the MAF sensor 180 may be located in any suitable location, including in a common housing that also includes the throttle valve 114. The EOS sensor 182 measures the output speed of the engine 102 in revolutions per minute (RPM) by measuring a rotational speed of the crankshaft (not shown). The MAP sensor 184 measures the pressure within the intake manifold 116. In various implementations, engine vacuum may be measured, wherein engine vacuum is the difference between ambient air pressure and the pressure within the intake manifold 116. The IAT sensor 186 measures the temperature of the air flowing into the engine 102. While the IAT sensor 186 is shown upstream of the throttle valve 114, the IAT sensor 186 may be located in any suitable location, including in a common packaging with the throttle valve 114.

Each system that varies an engine parameter may be referred to as an actuator that receives an actuator value. For example, the throttle actuator module 112 may be referred to as an actuator and the throttle opening area may be referred to as the actuator value. In the example of FIG. 1, the throttle actuator module 112 achieves the throttle opening area by adjusting the angle of the blade of the throttle valve 114.

Similarly, the spark actuator module 126 may be referred to as an actuator, while the corresponding actuator value may be the amount of spark advance relative to cylinder TDC. Other actuators may include the boost actuator module 164, the EGR actuator module 172, the phaser actuator module 158, and the fuel actuator module 124. For these actuators, the actuator values may correspond to boost pressure, EGR valve opening area, intake and exhaust cam phaser angles, and fueling rate.

The ECM 104 may use signals from the various sensors to make control decisions for the engine system 100. In particular, the ECM 104 may control actuator values in order to generate a desired torque from the engine 102. Additionally, as discussed herein, the ECM 104 may also control actuator values to produce a desired thermal energy of the exhaust produced by the engine 102. The ECM 104 may control actuator values to regulate the desired thermal energy of the exhaust to ensure proper operation of the catalytic converter 136.

The ECM 104 may also communicate with a transmission control module 194 to coordinate shifting gears in a transmission (not shown). For example, the ECM 104 may reduce torque during a gear shift. Additionally, the ECM 104 may communicate with a hybrid control module 196 to coordinate operation of the engine 102 and an electric machine (EM) 198. The EM 198 may function as a motor and/or a generator. When functioning as a motor, the EM 198 may produce drive torque. When functioning as a generator, the EM 198 may produce electrical energy for use by the engine system 100 and/or for storage in a battery (not shown). In various implementations, the ECM 104, catalyst diagnostic module 106, transmission control module 194, and hybrid control module 196 may be integrated into one or more modules.

Referring now to FIG. 2, a functional block diagram of an exemplary engine control system according to the principles of the present disclosure is presented. An exemplary implementation of the ECM 104 includes an axle torque arbitration module 210. The axle torque arbitration module 210 arbitrates between a driver input from the driver input module 110 and other axle torque requests. For example, the driver input may be based on position of an accelerator pedal. The driver input may also be based on cruise control, which may be an adaptive cruise control system that varies vehicle speed to maintain a predetermined following distance.

Torque requests may include target torque values as well as ramp requests, such as a request to ramp torque down to a minimum engine off torque or to ramp torque up from the minimum engine off torque. Axle torque requests may include a torque reduction requested during wheel slip by a traction control system. Axle torque requests may also include torque request increases to counteract negative wheel slip, where a tire of the vehicle slips with respect to the road surface because the axle torque is negative.

Axle torque requests may also include brake management requests and vehicle over-speed torque requests. Brake management requests may reduce engine torque to ensure that the engine torque output does not exceed the ability of the brakes to hold the vehicle when the vehicle is stopped. Vehicle over-speed torque requests may reduce the engine torque output to prevent the vehicle from exceeding a predetermined speed. Axle torque requests may also be made by body stability control systems. Axle torque requests may further include engine shutoff requests, such as may be generated when a critical fault is detected.

The axle torque arbitration module 210 outputs a predicted torque and an immediate torque based on the results of arbitrating between the received torque requests. The predicted torque is the amount of torque that the ECM 104 prepares the engine 102 to generate, and may often be based on the driver's torque request. The immediate torque is the amount of torque currently desired, which may be less than the predicted torque.

The immediate torque may be less than the predicted torque to provide torque reserves, as described in more detail below, and to meet temporary torque reductions. For example only, temporary torque reductions may be requested when a vehicle speed is approaching an over-speed threshold and/or when the traction control system senses wheel slippage.

The immediate torque may be achieved by varying engine actuators that respond quickly, while slower engine actuators may be used to prepare for the predicted torque. For example, in a gas engine, spark advance may be adjusted quickly, while air flow and cam phaser position may be slower to respond because of mechanical lag time. Further, changes in air flow are subject to air transport delays in the intake manifold. In addition, changes in air flow are not manifested as torque variations until air has been drawn into a cylinder, compressed, and combusted.

A torque reserve may be created by setting slower engine actuators to produce a predicted torque, while setting faster engine actuators to produce an immediate torque that is less than the predicted torque. For example, the throttle valve 114 can be opened, thereby increasing air flow and preparing to produce the predicted torque. Meanwhile, the spark advance may be reduced (in other words, spark timing may be retarded), reducing the actual engine torque output to the immediate torque.

The difference between the predicted and immediate torques may be called the torque reserve. When a torque reserve is present, the engine torque can be quickly increased from the immediate torque to the predicted torque by changing a faster actuator. The predicted torque is thereby achieved without waiting for a change in torque to result from an adjustment of one of the slower actuators. The axle torque arbitration module 210 may output the predicted torque and the immediate torque to a propulsion torque arbitration module 212. The predicted and immediate torques received by the propulsion torque arbitration module 212 are converted from an axle torque domain (torque at the wheels) into a propulsion torque domain (torque at the crankshaft).

The propulsion torque arbitration module 212 arbitrates between propulsion torque requests, including the converted predicted and immediate torques. The propulsion torque arbitration module 212 may generate an arbitrated predicted torque and an arbitrated immediate torque. The arbitrated torques may be generated by selecting a winning request from among received requests. Alternatively or additionally, the arbitrated torques may be generated by modifying one of the received requests based on another one or more of the received requests.

As discussed herein, a catalyst module 213 may output a torque request to the propulsion torque arbitration module corresponding to an engine torque and speed at which a desired thermal energy of the exhaust may be produced. The catalyst module 213 may adjust the torque request to reduce the difference between a requested RPM ($RPM_{req}$) at which the desired thermal energy of the exhaust may be produced and an actual RPM of the engine 102. In this manner, the catalyst module 213 may generate the torque request to adjust the thermal energy of the exhaust. The catalyst module may adjust the thermal energy of the exhaust to ensure the engine 102 is operating at the target operating conditions required to perform catalyst light-off and operate the catalytic converter within the target temperature operating range.

The catalyst module 213 may output the requested RPM. The catalyst module 213 may also output a spark request corresponding to a spark timing at which the desired thermal energy of the exhaust may be produced at the requested torque. In the foregoing manner, the catalyst module 213 may implement a catalyst light-off process and/or cold start emissions control process.

Other propulsion torque requests may include torque reductions for engine over-speed protection, torque increases for stall prevention, and torque reductions requested by the transmission control module 194 to accommodate gear shifts. Propulsion torque requests may also result from clutch fuel cutoff, which may reduce the engine torque output when the driver depresses the clutch pedal in a manual transmission vehicle.

Propulsion torque requests may also include an engine shutoff request, which may be initiated when a critical fault is detected. For example only, critical faults may include detection of vehicle theft, a stuck starter motor, electronic throttle control problems, and unexpected torque increases. For example only, engine shutoff requests may always win arbitration, thereby being output as the arbitrated torques, or may bypass arbitration altogether, simply shutting down the engine. The propulsion torque arbitration module 212 may still receive these shutoff requests so that, for example, appropriate data can be fed back to other torque requesters. For example, all other torque requesters may be informed that they have lost arbitration.

A reserves/loads module 214 receives the arbitrated predicted and immediate torque requests from the propulsion torque arbitration module 212. Various engine operating conditions may affect the engine torque output. In response to these conditions, the reserves/loads module 214 may create a torque reserve by increasing the predicted torque request.

For example only, the catalyst light-off process or a cold start emissions reduction process may directly vary the spark advance. In response, the reserves/loads module 214 may increase the predicted torque request to account for the effect of that spark advance on the engine torque output. In another example, the air/fuel ratio of the engine and/or the mass air flow may be directly varied, such as by diagnostic intrusive equivalence ratio testing process and/or new engine purging process. Corresponding predicted torque requests may be made to offset changes in the engine torque output during these processes.

The reserves/loads module 214 may also create a torque reserve in anticipation of a future load, such as the engagement of the air conditioning compressor clutch or power steering pump operation. The reserve for air conditioning (A/C) clutch engagement may be created when the driver first requests air conditioning. Subsequently, when the A/C clutch engages, the reserves/loads module 214 may add the expected load of the A/C clutch to the immediate torque request.

An actuation module 216 receives the predicted and immediate torque requests from the reserves/loads module 214. The actuation module 216 determines how the predicted and immediate torque requests will be achieved. The actuation module 216 may be engine type specific, with different control schemes for gas engines versus diesel engines. In various implementations, the actuation module 216 may define the boundary between modules prior to the actuation module 216 that are engine independent, and modules that are engine dependent.

For example, in a gas engine, the actuation module 216 may vary the opening of the throttle valve 114, which allows for a wide range of torque control. However, opening and closing the throttle valve 114 results in a relatively slow change in torque. Deactivating cylinders also provides for a wide range of torque control, but may be similarly slow and additionally involve drivability and emissions concerns. Changing spark advance is relatively fast, but does not provide as much range of torque control. In addition, the amount of torque control possible with spark (referred to as spark capacity) changes as the amount of air per cylinder changes.

In various implementations, the actuation module 216 may generate an air torque request based on the predicted torque request. The air torque request may be equal to the predicted torque request, causing air flow to be set so that the predicted torque request can be achieved by changes to other actuators. From the foregoing, it will be appreciated that the air torque request may be equal to the torque request generated by the catalyst module 213, causing air flow to be set so that the desired thermal energy of the exhaust may be achieved.

An air control module 218 may determine desired actuator values for slow actuators based on the air torque request. For example, the air control module 218 may control desired manifold absolute pressure (MAP), desired throttle area, and/or desired air per cylinder (APC). Desired MAP may be used to determine desired boost, and desired APC may be used to determine desired cam phaser positions. In various implementations, the air control module 218 may also determine an amount of opening of the EGR valve 170.

In gas systems, the actuation module 216 may also generate a spark torque request and a fuel mass torque request. The spark torque request may be based on the spark request generated by the catalyst module 213, causing the spark timing to be set so that the desired thermal energy of the exhaust may be achieved. The spark torque request may be used by a spark control module 226 to determine how much to retard the spark (which reduces the engine torque output) from a calibrated spark advance.

The fuel mass torque request may be used by a fuel control module 228 to vary the amount of fuel provided to each cylinder. For example only, the fuel control module 228 may determine a fuel mass that, when combined with the current amount of air per cylinder, yields stoichiometric combustion. The fuel control module 228 may instruct the fuel actuator module 124 to inject this fuel mass for each activated cylinder. During normal engine operation, the fuel control module 228 may attempt to maintain a stoichiometric air/fuel ratio.

The fuel control module 228 may increase the fuel mass above the stoichiometric value to increase engine torque output and may decrease the fuel mass to decrease engine torque output. In various implementations, the fuel control module 228 may receive a desired air/fuel ratio that differs from the stoichiometric air/fuel ratio. The fuel control module 228 may then determine a fuel mass for each cylinder that achieves the desired air/fuel ratio. In diesel systems, fuel mass may be the primary actuator for controlling engine torque output.

The approach the actuation module 216 takes in achieving the immediate torque request may be determined by a mode setting. The mode setting may be provided to the actuation module 216, such as by the propulsion torque arbitration module 212, and may select modes including an inactive mode, a pleasible mode, a maximum range mode, and an auto actuation mode.

In the inactive mode, the actuation module 216 may ignore the immediate torque request and attempt to achieve the predicted torque request. The actuation module 216 may therefore set the spark torque request and the fuel mass torque request to the predicted torque request, which maximizes torque output for the current engine air flow conditions. Alternatively, the actuation module 216 may set these requests to predetermined (such as out-of-range high) values to disable torque reductions from retarding spark or reducing the fuel/air ratio.

In the pleasible mode, the actuation module 216 may attempt to achieve the immediate torque request by adjusting only spark advance. The actuation module 216 may therefore output the predicted torque request as the air torque request and the immediate torque request as the spark torque request. The spark control module 226 will retard the spark as much as possible to attempt to achieve the spark torque request. If the desired torque reduction is greater than the spark reserve capacity (the amount of torque reduction achievable by spark retard), the torque reduction may not be achieved.

In the maximum range mode, the actuation module 216 may output the predicted torque request as the air torque request and the immediate torque request as the spark torque request. In addition, the actuation module 216 may generate a cylinder shut-off torque request that is low enough to enable the spark control module 226 to achieve the immediate torque request. In other words, the actuation module 216 may decrease the cylinder shut-off torque request (thereby deactivating cylinders) when reducing spark advance alone is unable to achieve the immediate torque request.

In the auto actuation mode, the actuation module 216 may decrease the air torque request based on the immediate torque request. For example, the air torque request may be reduced only so far as is necessary to allow the spark control module 226 to achieve the immediate torque request by adjusting spark advance. Therefore, in auto actuation mode, the immediate torque request is achieved while allowing the engine 102 to return to the predicted torque request as quickly as possible. In other words, the use of relatively slowly-responding throttle valve corrections is minimized by reducing the quickly-responding spark advance as much as possible.

A torque estimation module 224 may estimate torque output of the engine 102. This estimated torque may be used by the air control module 218 to perform closed-loop control of engine air flow parameters, such as throttle area, MAP, and phaser positions. For example only, a torque relationship such as (Equation 1):

$$T=f(APC,S,I,E,AF,OT,\#) \quad (1)$$

may be defined, where torque (T) is a function of air per cylinder (APC), spark advance (S), intake cam phaser position (I), exhaust cam phaser position (E), air/fuel ratio (AF), oil temperature (OT), and number of activated cylinders (#). Additional variables may be accounted for, such as the degree of opening of an exhaust gas recirculation (EGR) valve.

This relationship may be modeled by an equation and/or may be stored as a lookup table. The torque estimation module 224 may determine APC based on measured MAF and current RPM, thereby allowing closed loop air control based on actual air flow. The intake and exhaust cam phaser positions used may be based on actual positions, as the phasers may be traveling toward desired positions.

While the actual spark advance may be used to estimate torque, when a calibrated spark advance value is used to estimate torque, the estimated torque may be called an estimated air torque. The estimated air torque is an estimate of how much torque the engine could generate at the current air flow if spark retard were removed (i.e. if spark advance were set to the calibrated spark advance value).

The air control module 218 may generate a desired manifold absolute pressure (MAP) signal, which is output to a boost scheduling module 222. The boost scheduling module 222 uses the desired MAP signal to control the boost actuator module 164. The boost actuator module 164 then controls one or more turbochargers (e.g. turbocharger 160) and/or superchargers.

The air control module 218 may generate a desired area signal, which is output to the throttle actuator module 112. The throttle actuator module 112 then regulates the throttle valve 114 to produce the desired throttle area. The air control module 218 may generate the desired area signal based on an inverse torque model and the air torque request. The air control module 218 may use the estimated air torque and/or the MAF signal in order to perform closed loop control. For example, the desired area signal may be controlled to minimize a difference between the estimated air torque and the air torque request.

The air control module 218 may also generate a desired air per cylinder (APC) signal, which is output to a phaser scheduling module 220. Based on the desired APC signal and the RPM signal, the phaser scheduling module 220 may control positions of the intake and/or exhaust cam phasers 148 and 150 via the phaser actuator module 158.

Referring back to the spark control module 226, spark advance values may be calibrated at various engine operating conditions. For example only, a torque relationship may be inverted to solve for desired spark advance. For a given torque request ($T_{des}$), the desired spark advance ($S_{des}$) may be determined according to the following relationship (Equation 2):

$$S_{des}=T^{-1}(T_{des},APC,I,E,AF,OT,\#). \quad (2)$$

This relationship may be embodied as an equation and/or as a lookup table. The air/fuel ratio (AF) may be the actual ratio, as indicated by the fuel control module 228.

When the spark advance is set to the calibrated spark advance, the resulting torque may be as close to a mean best torque (MBT) as possible. As used herein, MBT refers to the maximum torque that may be generated for a given air flow as spark advance is increased, when using fuel having an octane rating greater than a predetermined threshold. The spark advance at which this maximum torque occurs may be referred to as MBT spark. The calibrated spark advance may differ from MBT spark because of, for example, fuel quality (such as when lower octane fuel is used) and environmental factors. The torque at the calibrated spark advance may therefore be less than MBT.

The catalyst diagnostic module 106 receives the torque request, the spark request, and the requested RPM from the catalyst module 213 along with one or more signals that include, but are not limited to, RPM and MAF. Based on the requested torque, the requested spark timing, the requested RPM, MAF, and other signals received, the catalyst diagnostic module 106 generates a diagnostic signal ("DIAGNOSTIC RESULT"). The diagnostic signal may indicate whether the engine 102 is operating at the target operating conditions and whether emissions meet the applicable standards. For example only, the diagnostic signal may include diagnostic information, such as a diagnostic trouble code (DTC) and a corresponding diagnostic status of the DTC. The catalyst diagnostic module 106 may store the DTC and the corresponding diagnostic status in memory 232 as shown.

Figure 3:
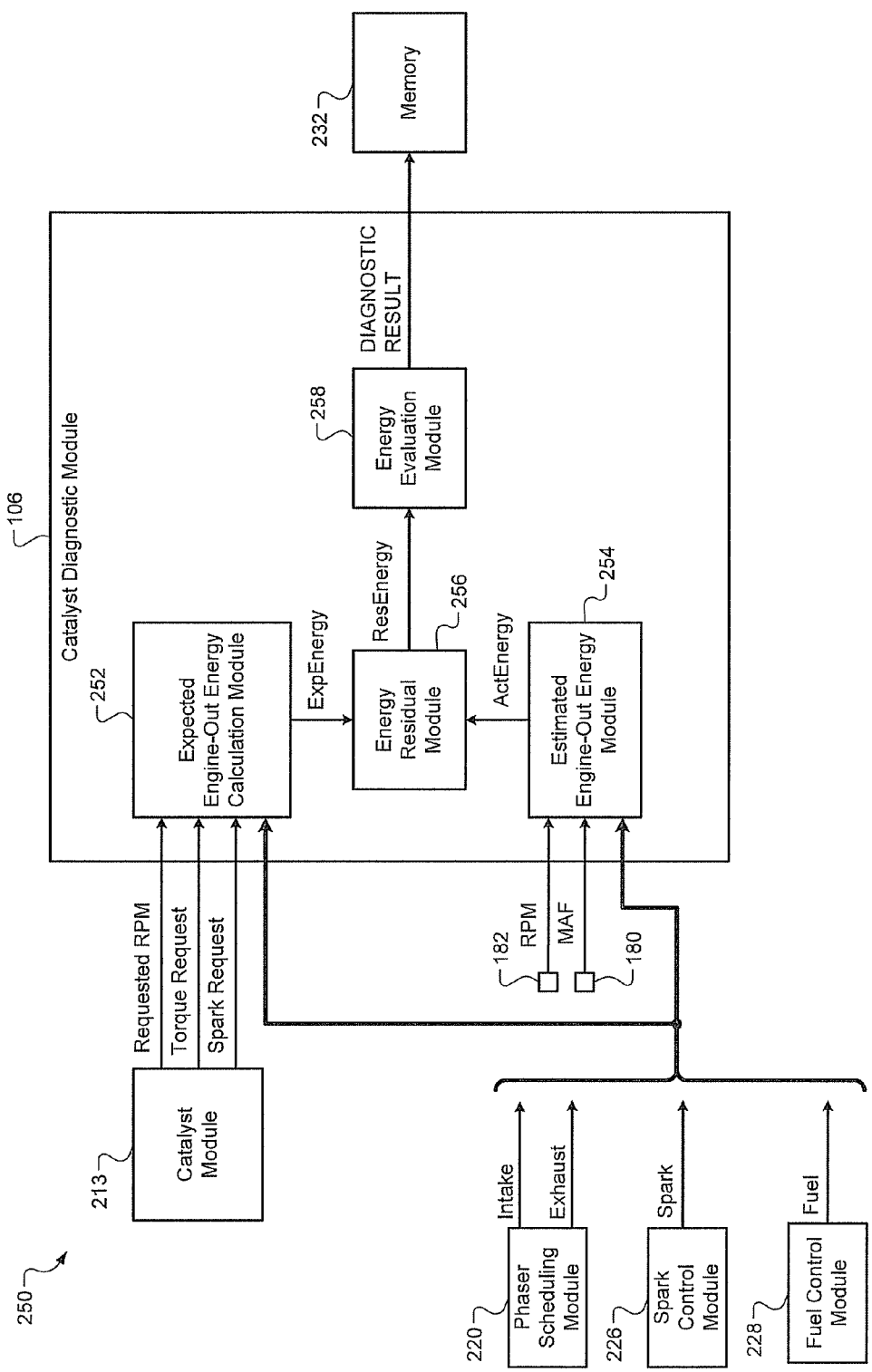
FIG. 3 is a functional block diagram illustrating an exemplary catalyst diagnostic system according to the principles of the present disclosure.

With particular reference to FIG. 3, a functional block diagram of an exemplary catalyst diagnostic system 250 according to the principles of the present disclosure is shown. The catalyst diagnostic system 250 may perform an exemplary CSED diagnostic method as discussed in further detail below. The exemplary catalyst diagnostic module 106 includes an expected engine-out energy calculation module 252 and an estimated engine-out energy module 254. The catalyst diagnostic module 106 further includes an energy residual module 256 and an energy evaluation module 258. The modules 252-258 work together to generate the diagnostic signal, DIAGNOSTIC RESULT.

The expected engine-out energy calculation module 252 periodically determines an expected engine-out thermal energy ("ExpEnergy") of the exhaust and outputs ExpEnergy to the energy residual module 256. Engine-out energy ($\dot{E}$) flow may be generally represented by the following formula (Equation 3):

$$\dot{E} = [f1(\text{rpm}) * n * f2(\text{engine torque})] * [f3(\text{spark timing})] \quad (3)$$

where $f1(\text{rpm})$ represents a function of engine speed, n is the number of cylinders (e.g., cylinder 118), $f2(\text{engine torque})$ represents a function of engine torque, and $f3(\text{spark timing})$ represents a function of engine spark timing.

The function of engine speed and the function of engine torque may be used to determine an engine-out mass air flow rate in units of grams (g) per second (s). The engine-out mass air flow rate may be an air flow rate per cylinder (APC) value. The function of ignition timing may be used to calculate a thermal energy potential (TEP) of the exhaust in units of Joules (J) per gram (g). The product of the mass air flow rate of the engine exhaust and the thermal energy potential of the engine exhaust may be used to determine an energy flow rate in units of Joules (J) per second (s). Thus, Engine-out energy ($\dot{E}$) may also be represented by the following formulas (Equations 4 and 5):

$$\dot{E} = [f1(\text{mass air flow})] * [f2(\text{energy potential})] \quad (4)$$

$$\dot{E} = [f1(\text{rpm}) * n * f2(APC)] * [f3(\text{energy potential})] \quad (5)$$

Accordingly, the expected engine-out energy calculation module 252 may determine ExpEnergy based on a calculated APC (APCcalc). According to the principles of the present disclosure, the expected engine-out energy calculation module 252 calculates APCcalc based on the torque request ($T_{req}$), the spark request ($S_{req}$), and the requested RPM ($RPM_{req}$) output by the catalyst module 213 and the various actuator positions using an inverse torque model. The expected engine-out energy calculation module 252 may receive the requested torque, $T_{req}$, the requested spark timing, $S_{req}$, and the requested RPM, $RPM_{req}$, from the catalyst module 213 as shown. The inverse torque model may be represented by the following general equation (Equation 6):

$$APC_{calc} = T_{apc}^{-1}(T_{req}, S_{req}, RPM, I, E, AF, OT, \#). \quad (6)$$

The expected engine-out energy calculation module 252 may determine APCcalc using the following seven-term second-order torque model (Equation 7):

$$T_b = K_{A2} * A^2 + K_A * A + K_{AS} * A * S_b + K_{AS2} * A * S_b^2 + K_S * S_b + K_{S2} * S_b^2 + K_R, \quad (7)$$

where $T_b$ is a bounded torque value based on the requested torque, $T_{req}$, A is APCcalc, and $S_b$ is a bounded spark value based on the requested spark timing, $S_{req}$. $K_A$, $K_{AS}$, $K_{AS2}$, $K_S$, $K_{S2}$, and $K_R$ are APC torque sensitivity constants (APC k-values). The APC k-values may be predetermined values that can be based on actuator positions (i.e. values) such as, but not limited to, engine speed (RPM), spark advance (S), intake (I) and exhaust (E) cam phaser angles, air/fuel ratio (AF), oil temperature (OT), and the number of cylinders currently being fueled (#). For spark advance (S) and engine speed (RPM), the APC k-values may be based on the requested spark timing, $S_{req}$, and the requested RPM, $RPM_{req}$, respectively. Alternatively, the APC k-values may be based on the actual spark timing and/or the actual RPM.

The APC k-values may be scaled in order to ensure unit balance in Equation 7. The APC k-values may be stored in memory tables in memory 232 and looked up based on the actuator positions for use in the foregoing inverse torque model. Further discussion of an exemplary control system and method for determining an APC value according to the second order torque model of Equation 7 can be found in commonly assigned U.S. patent application Ser. No. 12/259, 695, filed on Oct. 28, 2008 entitled "Inverse Torque Model Solution and Bounding," the disclosure of which is incorporated herein by reference in its entirety.

The expected engine-out energy calculation module 252 may receive the requested spark timing from the catalyst module 213 and determine a calculated TEP (TEPcalc) based on the requested spark timing. For example, the expected engine-out energy calculation module 252 may look up TEPcalc in memory tables of the memory 232 based on the requested spark timing. The tables may contain predetermined values for the calculated TEP developed from empirical testing or modeling of the engine 102.

The estimated engine-out energy module 254 periodically determines an estimated actual thermal energy ("ActEnergy") of the exhaust and outputs ActEnergy to the energy residual module 256. More specifically, the estimated engine-out energy module 254 determines ActEnergy according to Equation 4 based on a measured MAF (MAFmeas) of the engine 102, the actual spark timing, and an estimated TEP (TEPest). The estimated engine-out energy module 254 may determine MAFmeas based on the MAF indicated by the MAF sensor 180. Alternatively, the estimated engine-out energy module 254 may determine MAFmeas based on the IAT, MAP, and RPM indicated by the IAT sensor 186, MAP sensor 184, and EOS sensor 182, respectively. The estimated engine-out energy module 254 may look up TEPest in the tables stored in the memory 232 based on the actual spark timing.

The energy residual module 256 receives ExpEnergy and ActEnergy and periodically determines a thermal energy residual (ResEnergy) based on ExpEnergy and ActEnergy. For example only, the energy residual module 256 may determine ResEnergy by calculating a difference between ExpEnergy and ActEnergy. The energy residual module 256 outputs ResEnergy to the energy evaluation module 258.

The energy evaluation module 258 receives ResEnergy and periodically generates the DIAGNOSTIC RESULT signal. The energy evaluation module 258 may generate the DIAGNOSTIC RESULT signal to update the diagnostic status of the DTC corresponding to the CSED diagnostic. The diagnostic status of the DTC may be updated once per vehicle trip (i.e. key cycle). The energy evaluation module 258 may collect a predetermined number (R) of ResEnergy values during a diagnostic period and calculate an average energy residual (AVEResEnergy) for the diagnostic period. The energy evaluation module 258 may generate the DIAGNOSTIC RESULT signal upon completion of the diagnostic period. The energy evaluation module 258 may generate the DIAGNOSTIC RESULT signal based on a comparison of AVEResEnergy and a predetermined energy range defined by lower and upper energy thresholds.

The predetermined energy range may correspond to operating the catalytic converter 136 within the target temperature range. The lower energy threshold may be less then the upper energy threshold and may be a calibrated value indicative of underheating the catalytic converter 136. The upper energy threshold may be a calibrated value indicative of overheating the catalytic converter. The energy evaluation module 258 may generate DIAGNOSTIC RESULT to indicate a problem when AVEResEnergy is greater than or equal to the upper energy threshold or less than or equal to the lower energy threshold. The lower and upper energy thresholds may be stored in the memory 232.

In the foregoing manner, the catalyst diagnostic system 250 generates the CSED diagnostic result for the torque-based engine control system 200. The catalyst diagnostic system 250 generates the diagnostic result based on a thermal energy residual of the exhaust. The thermal energy residual is determined based on a calculated APC and an actual MAF of the engine 102. The catalyst diagnostic system 250 implements an inverse torque model and calculates the calculated APC according to the inverse torque model based on an engine torque and a spark timing requested to produce a desired thermal energy of the exhaust. The catalyst diagnostic system 250 includes a MAF sensor that measures the actual MAF of the engine 102.

Figure 4:
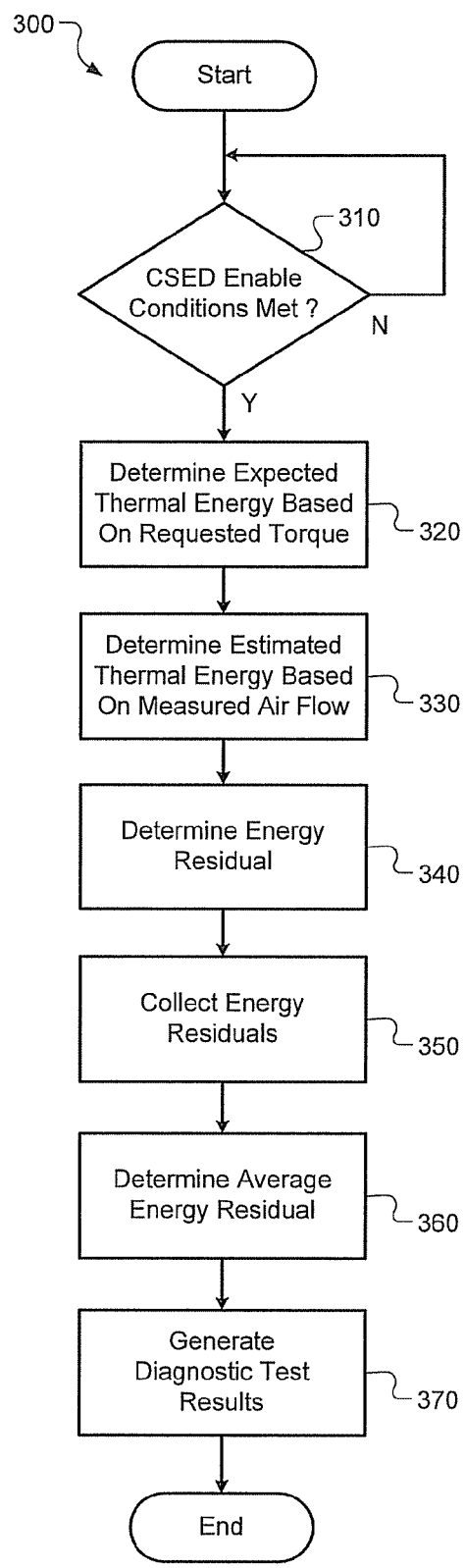
FIG. 4 is a flow diagram illustrating exemplary steps for a control method according to the principles of the present disclosure.

With particular reference to FIG. 4, an exemplary CSED diagnostic control method 300 according to the principles of the present disclosure is shown. The method 300 improves the correlation between a calculated thermal energy residual of the exhaust and the estimated emissions. The method 300 may be run during periods following cold starting of an engine (e.g., engine 102) to determine whether the engine is operating within target operating conditions required to heat a catalytic converter to within a target operating temperature range. The method 300 may be implemented with the various modules of the engine system 100 shown in FIGS. 1-3 and previously described herein. For simplicity, the control method will be described with reference to the control parameters previously discussed herein.

Control under the method 300 begins in step 310 where control determines whether enable conditions are met. In general, the enable conditions may be met when there are no active faults that will prevent the method 300 from producing a reliable diagnostic result. Active faults which may adversely affect the reliability of the diagnostic result include, but are not limited to, a MAF sensor fault, an EOS sensor fault, a throttle fault, a fuel injection system fault, a spark coil fault, an engine misfire fault, and an idle speed control fault. Other faults may also be considered. Additionally, the enable conditions will generally be met when a catalyst light-off process and/or cold start emissions control process is active. The enable conditions may also be met when engine idle conditions are met and engine run time is less than a calibrated value. If the enable conditions are met, control continues in step 320, otherwise control loops back as shown.

In step 320, control periodically determines an expected thermal energy (ExpEnergy) based on a requested engine speed, the number of cylinders, a calculated APC (APCcalc), and a calculated TEP (TEPcalc). Control may determine ExpEnergy based on APCcalc using Equation 5 as previously described herein. Control determines APCcalc based on a requested torque using an inverse torque model, such as the inverse torque model of Equations 6 and 7. Control may further determine APCcalc based on a requested spark timing. The requested torque may correspond to an engine torque and speed (i.e. requested engine speed) at which the desired thermal energy of the exhaust may be produced. The requested spark may correspond to a spark timing at which the desired thermal energy of the exhaust may be produced at the requested torque.

For example, with particular reference to FIG. 5, exemplary control steps for determining ExpEnergy are shown. In step 322, control determines APCcalc based on the requested torque, the requested spark timing, and the requested engine speed using the inverse torque model of Equations 6 and 7 as previously described herein. In step 324, control determines a calculated mass air flow of the engine (MAFcalc) based on APCcalc, the number of cylinders (n), and the requested engine speed ($RPM_{req}$). Control determines MAFcalc as a product of APCcalc, n, and $RPM_{req}$. In step 326, control determines a calculated thermal energy potential (TEPcalc) of the exhaust based on the requested spark timing. Control may determine TEPcalc by looking up TEPcalc in tables stored in memory based on the requested spark timing. In step 328, control calculates ExpEnergy as a product of MAFcalc and TEPcalc, ending control in step 320.

Referring again to FIG. 4, control continues in step 330 where control periodically determines an estimated actual thermal energy (ActEnergy) of the exhaust based on a measured MAF (MAFmeas) of the air entering the engine and an estimated TEP (TEPest) of the exhaust exiting the engine. For example, with particular reference to FIG. 6, exemplary steps for determining ActEnergy are shown. In step 332, control determines MAFmeas by measuring an actual MAF of the engine. In step 334, control determines TEPest based on an actual spark timing. For example only, control may determine TEPest by looking up TEPest in tables stored in memory based on the actual spark timing. In step 336, control determines ActEnergy as a product of MAFmeas and TEPest, ending control in step 330. For example only, control may determine ActEnergy according to Equation 4 as previously described.

Referring again to FIG. 4, control continues in step 340 where control periodically determines a thermal energy residual (ResEnergy) based on ExpEnergy and ActEnergy. For example only, control may periodically determine a predetermined number (R) of ResEnergy values during a diagnostic period. Control may determine each ResEnergy value as a difference between current values of ExpEnergy and ActEnergy.

In step 350, control collects the residual energy values (i.e. ResEnergy values) determined in step 340 during the diagnostic period. Control may store the residual energy values in memory for retrieval in a subsequent control step. In step 360, control determines an average energy residual (AVEResEnergy). Control may determine AVEResEnergy after the predetermined number (R) of residual energy values have been collected in step 350. For example only, control may determine AVEResEnergy when a counter that counts the number of energy residual values reaches the predetermined number (R). The predetermined number (R) may correspond to a desired statistical confidence for AVEResEnergy. The counter value may also take into account a control period between successive calculations of the energy residual values in step 340. Alternatively, control may determine AVEResEnergy when a timer that determines a period since the enable conditions were met in step 310 reaches a predetermined timer value. The timer value may correspond to the diagnostic period. For example only, the timer value may be around ten to twelve seconds.

In step 370, control generates a diagnostic test result for the diagnostic period based on a comparison of AVEResEnergy and a predetermined energy range defined by lower and upper energy thresholds. For example only, control may fail the diagnostic test when AVEResEnergy is less than or equal to the lower energy threshold or greater than or equal to the upper energy threshold. Alternatively, control may pass the diagnostic test when AVEResEnergy is within the predetermined energy range. Control under the method 300 ends in step 370.

In the foregoing manner, the method 300 generates the CSED diagnostic result for a torque-based engine control system based on a thermal energy residual of the exhaust. The method 300 determines the thermal energy residual based on a calculated APC and a measured MAF. The method 300 calculates the calculated APC using an inverse torque model based on an engine torque and a spark timing requested to produce a desired thermal energy of the exhaust. The measured MAF is based on a measured, actual MAF of the engine.

The method 300 improves the reliability of the CSED diagnostic result by improving the correlation between the thermal energy residual calculated according to the method and the estimated emissions. The method 300 also improves the reliability of the CSED diagnostic result by improving the separation between the thermal energy residual calculated for the normal system and the upper and lower energy thresholds corresponding to the best performance unacceptable system.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine including a catalytic converter, the control system comprising:
   an energy calculation module that calculates a calculated mass air flow (MAF) of intake air of said engine based on a requested torque and a requested spark timing that correspond to a desired thermal energy of exhaust of said engine, and that calculates a first thermal energy of said exhaust based on said calculated MAF; and
   an energy residual module that determines a thermal energy residual of said exhaust based on said first thermal energy and a second thermal energy of said exhaust, wherein said second thermal energy is calculated based on a measured MAF of said intake air.

2. The control system of claim 1 wherein said energy calculation module calculates said calculated MAF based on a square of said requested spark timing.

3. The control system of claim 1 wherein said calculated MAF is an air per cylinder value.

4. The control system of claim 1 further comprising an energy evaluation module that determines a diagnostic result based on a comparison of said thermal energy residual and a predetermined energy range, wherein said diagnostic result indicates whether said catalytic converter is operating within a target temperature range.

5. The control system of claim 4 wherein said predetermined energy range includes a first threshold energy lower than a second threshold energy, wherein said first threshold energy is indicative of underheating said catalytic converter and said second threshold energy is indicative of overheating said catalytic converter.

6. The control system of claim 4 wherein:
   said energy residual module periodically calculates a plurality of thermal energy residuals during a diagnostic period,
   said energy evaluation module determines said diagnostic result after said energy evaluation module has calculated a predetermined number (R) of said thermal energy residuals, R being an integer greater than one, and
   said energy evaluation module determines said diagnostic result based on a comparison of an average of said R thermal energy residuals and said predetermined energy range.

7. The control system of claim 4 wherein:
   said energy residual module calculates a plurality of thermal energy residuals during a predetermined diagnostic period, and
   said energy evaluation module determines said diagnostic result after said predetermined diagnostic period based on a comparison of an average of said plurality of thermal energy residuals and said predetermined energy range.

8. A method for determining a thermal energy residual of exhaust of an engine, the method comprising:
   in a diagnostic module:
      measuring an actual mass air flow (MAF) of intake air of said engine;
      calculating a calculated MAF of said intake air based on a requested torque and a requested spark timing that correspond to a desired thermal energy of said exhaust;
      calculating a first thermal energy based on said calculated MAF;
      calculating a second thermal energy based on said actual MAF; and
      determining said thermal energy residual based on the first thermal energy of said exhaust and the second thermal energy of said exhaust.

9. The method of claim 8 wherein calculating said calculated MAF includes calculating said calculated MAF based on a square of said requested spark timing.

10. The method of claim 8 wherein said calculated MAF is an air per cylinder value.

11. A diagnostic method for an engine including a catalytic converter, the method comprising:
    in a diagnostic module:
       measuring an actual mass air flow (MAF) of intake air of said engine;
       calculating a calculated MAF of said intake air of said engine based on a requested torque and a requested spark timing that correspond to a desired thermal energy of exhaust of said engine;
       calculating a first thermal energy based on said calculated MAF;
       calculating a second thermal energy based on said actual MAF;
       determining a thermal energy residual of said exhaust based on the first thermal energy of said exhaust and the second thermal energy of said exhaust; and
       determining a diagnostic result by comparing said thermal energy residual and a predetermined energy range, wherein said diagnostic result indicates whether said catalytic converter is operating within a target temperature range.

12. The diagnostic method of claim 11 wherein said predetermined energy range includes a first threshold energy lower than a second threshold energy, wherein said first threshold energy is indicative of underheating said catalytic converter and said second threshold energy is indicative of overheating said catalytic converter.

13. The diagnostic method of claim 11 further comprising determining a predetermined number (R) of said thermal energy residuals during a diagnostic period, R being an integer greater than one, wherein said determining said diagnostic result is performed after determining said R thermal energy residuals by comparing an average of said R thermal energy residuals and said predetermined energy range.

14. The diagnostic method of claim 11 further comprising determining a plurality of thermal energy residuals during a predetermined diagnostic period, wherein said determining said diagnostic result is performed after said diagnostic period by comparing an average of said plurality of thermal energy residuals and said predetermined energy range.

* * * * *